US011170793B2

(12) United States Patent
Jin et al.

(10) Patent No.: US 11,170,793 B2
(45) Date of Patent: Nov. 9, 2021

(54) SECURE AUDIO WATERMARKING BASED ON NEURAL NETWORKS

(71) Applicant: ADOBE INC., San Jose, CA (US)

(72) Inventors: Zeyu Jin, San Francisco, CA (US); Oona Shigeno Risse-Adams, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/790,301

(22) Filed: Feb. 13, 2020

(65) Prior Publication Data
US 2021/0256978 A1    Aug. 19, 2021

(51) Int. Cl.
| | | |
|---|---|---|
| *G10L 19/018* | (2013.01) | |
| *G10L 17/18* | (2013.01) | |
| *G10L 17/04* | (2013.01) | |
| *G06N 3/08* | (2006.01) | |
| *G10L 15/08* | (2006.01) | |
| *G10L 15/06* | (2013.01) | |

(52) U.S. Cl.
CPC .......... *G10L 19/018* (2013.01); *G06N 3/088* (2013.01); *G10L 15/063* (2013.01); *G10L 15/08* (2013.01); *G10L 17/04* (2013.01); *G10L 17/18* (2013.01)

(58) Field of Classification Search
CPC .................................................. G10L 19/018
See application file for complete search history.

(56) References Cited

U.S. PATENT DOCUMENTS

| 6,363,159 B1 | 3/2002 | Rhoads |
| 9,548,053 B1 | 1/2017 | Basye et al. |

(Continued)

FOREIGN PATENT DOCUMENTS

CN    108682425 A    10/2018

OTHER PUBLICATIONS

Tai, Yuan-Yen, and Mohamed F. Mansour. "Audio Watermarking over the Air with Modulated Self-correlation." ICASSP 2019-2019 IEEE International Conference on Acoustics, Speech and Signal Processing (ICASSP). IEEE, 2019.

(Continued)

*Primary Examiner* — Douglas Godbold
(74) *Attorney, Agent, or Firm* — Shook, Hardy & Bacon L.L.P.

(57) ABSTRACT

Embodiments provide systems, methods, and computer storage media for secure audio watermarking and audio authenticity verification. An audio watermark detector may include a neural network trained to detect a particular audio watermark and embedding technique, which may indicate source software used in a workflow that generated an audio file under test. For example, the watermark may indicate an audio file was generated using voice manipulation software, so detecting the watermark can indicate manipulated audio such as deepfake audio and other attacked audio signals. In some embodiments, the audio watermark detector may be trained as part of a generative adversarial network in order to make the underlying audio watermark more robust to neural network-based attacks. Generally, the audio watermark detector may evaluate time domain samples from chunks of an audio clip under test to detect the presence of the audio watermark and generate a classification for the audio clip.

20 Claims, 7 Drawing Sheets

(56) References Cited

U.S. PATENT DOCUMENTS

| | | | |
|---|---|---|---|
| 9,870,508 B1* | 1/2018 | Hodgson | G11B 27/10 |
| 2003/0095683 A1* | 5/2003 | Najarian | G06T 1/0071 |
| | | | 382/100 |
| 2014/0142958 A1 | 5/2014 | Sharma et al. | |
| 2016/0049154 A1* | 2/2016 | Chen | G10L 19/018 |
| | | | 700/94 |
| 2016/0064008 A1 | 3/2016 | Graham | |
| 2016/0378427 A1 | 12/2016 | Sharma et al. | |
| 2017/0372445 A1* | 12/2017 | Nielsen | G06Q 30/0201 |
| 2018/0358027 A1* | 12/2018 | Srinivasan | G10L 25/18 |
| 2019/0362719 A1* | 11/2019 | Gruenstein | G10L 15/063 |
| 2019/0370440 A1 | 12/2019 | Gu et al. | |
| 2020/0035232 A1 | 1/2020 | Garcia | |
| 2020/0154160 A1* | 5/2020 | Godfrey | H04N 21/2547 |
| 2021/0012450 A1* | 1/2021 | Malvar | H04N 1/32144 |
| 2021/0050025 A1* | 2/2021 | Huffman | G10L 19/018 |

OTHER PUBLICATIONS

Combined Search Report and Examination Report received for GB Patent Application No. 2020079.6, dated Jun. 10, 2021, 5 pages.
First Examination Report dated Jul. 27, 2021 in Australian Patent Application No. 2020289816, 8 pages.

* cited by examiner

η=80 (sounds like wind)
Base model
Threshold = 8

η=8 (barely noticeable)
Our model

SECURE AUDIO WATERMARKING BASED ON NEURAL NETWORKS

BACKGROUND

An audio watermark is some signal, code, or identifier embedded into an audio waveform to indicate some meta information about the audio, such as copyright ownership. Audio watermarking is the process of embedding and/or detecting an audio watermark. Audio watermarks are commonly designed to be imperceptible (e.g., should not impact audio quality), robust (e.g., able to withstand common signal processing and attacks), and secure (detectible only by authorized parties). There are a number of types of embedding techniques for audio watermarking, such as amplitude modification, dither watermarking, phase coding, echo watermarking, spread spectrum watermarking, and psychoacoustic embedding. Generally, some signal processing operations and deliberate attacks aim to degrade the watermark, which can indicate tampering or copying. Various watermarking techniques can be used to prevent these types of signal processing operations and deliberate attacks. As such, audio watermarking has applications in authentication and forgery prevention.

Recently, neural networks have been used to synthesize audio and video forgeries called "deepfakes." For example, malicious actors have created fake videos of people saying things they never said, videos that swap someone else's face onto another person's body, and other potentially unwanted applications. Deepfakes have been gaining some attention for their use in propagating fake news, among other applications. While the graphics community has begun exploring preventative approaches, there is a notable lack of deepfake research in the audio community.

SUMMARY

Embodiments of the present invention are directed secure audio watermarking and audio authenticity verification. An audio watermark detector may include a neural network trained to detect a particular audio watermark and embedding technique, which may indicate source software used in a workflow that generated an audio file under test. For example, audio generation software such as voice manipulation software may be used to embed an audio watermark into a generated audio signal. If the watermarked audio signal is used to generate some type of forgery such as a deepfake, an audio watermark detector can evaluate the audio of the forgery (degraded audio) for the presence of the audio watermark. Detecting the watermark in a particular audio clip can serve as an indication that the voice manipulation software was used to generate the audio clip that was used to generate the forgery. By implication, this can serve as an indication that some type of audio or voice manipulation was performed on an audio signal under test. Thus, the audio watermark detector can be used to identify and flag manipulated audio such as deepfake audio and other attacked audio signals.

Generally, an audio watermark may be embedded in, and detected from, a chunk of audio from each window (or some subset thereof) of a generated audio clip. The audio clip may be manipulated in various ways, whether through standard signal processing operations (e.g., compression and filtering) or attacks on the audio designed to remove the audio watermark (e.g., pitch shifting, added reverb, time-stretching, denoising, re-recording, resynthesis), resulting in degradation to the audio and the audio watermark. The audio watermark detector may evaluate time domain samples from chunks of a degraded audio clip under test to detect the presence of the audio watermark. For example, the audio watermark detector may include a convolutional neural network that performs one dimensional (1D) convolutions on samples from chunks of audio from a sliding window of the degraded audio clip, and outputs a classification label indicating whether a particular chunk of audio is watermarked or not watermarked. The detector may be fed successive or periodic chunks of degraded audio and output a classification for each chunk (watermarked or not watermarked). A probabilistic metric may be applied to generate an overall classification for an audio signal under test (e.g., detect the presence of the watermark based on a threshold amount of chunks such as 50% or 90% being classified as having the watermark).

Generally, an audio watermark detector may be trained using any suitable training dataset with audio content corresponding to the application of interest (e.g., real/synthetic speech for speech-based applications). More specifically, a dedicated audio watermark detector may be trained for each specific combination of audio watermark and embedding technique, so training a particular audio watermark detector may involve generating training data by embedding audio clips with the same watermark using the same embedding technique. In some embodiments, a watermark detector network may be implemented using a generative adversarial network, in which the audio watermark detector may be implemented using a discriminator network, a neural network attacker may be implemented using a generative network, and the audio watermark detector and neural network attacker may be jointly trained in order to make the underlying audio watermark more robust to neural network-based attacks.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
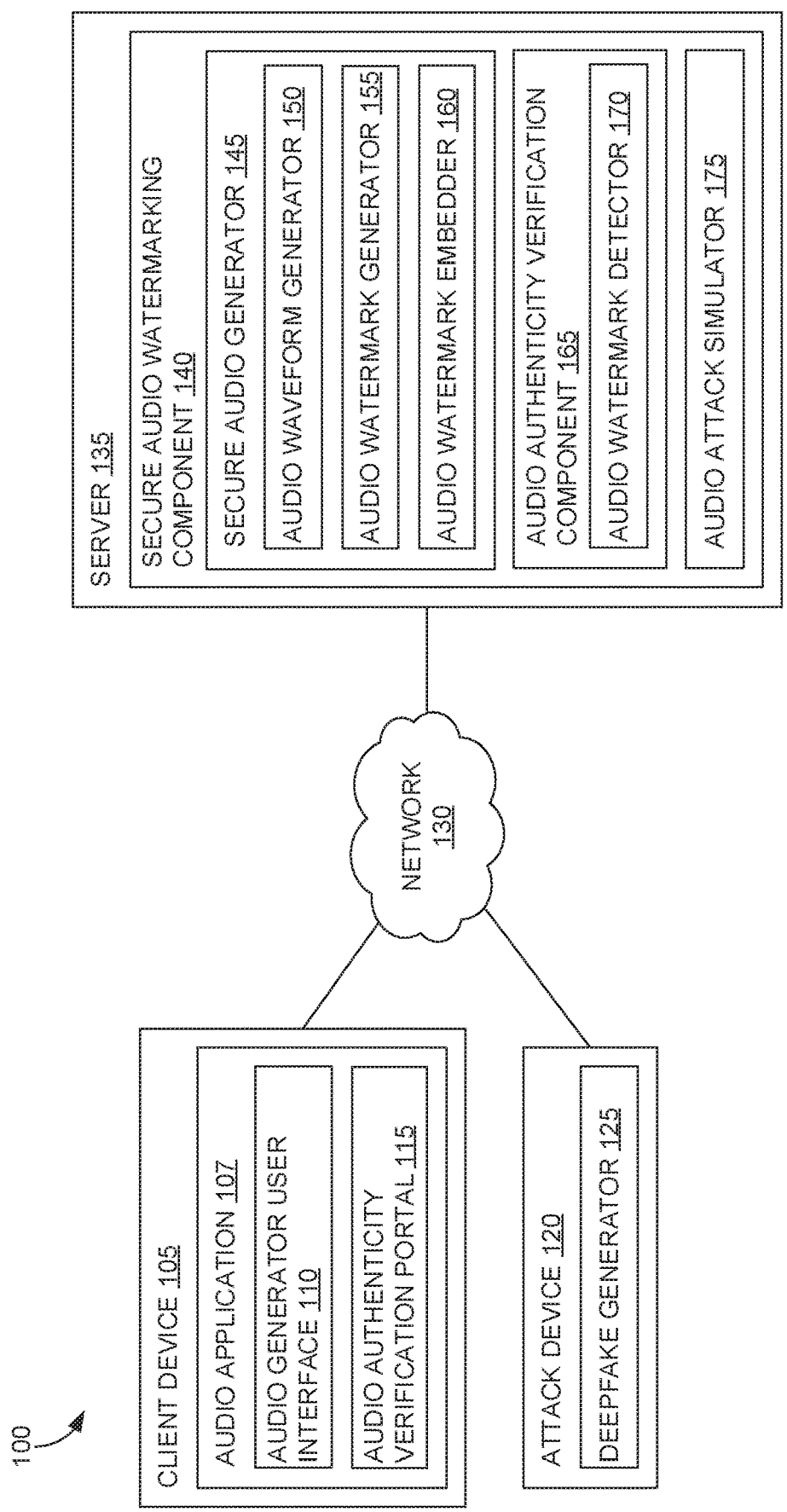
FIG. 1 is a block diagram of an example computing system for audio watermarking, in accordance with embodiments of the present invention.

Watermarking has been used in other domains besides audio. For example, the movie industry often hides and detects keys or other watermarks within video frames of movies in a way that is visually imperceptible. However, audio watermarking is fundamentally different than video or image watermarking. In video/image watermarking, viewers see in the pixel domain, not the frequency domain. As a result, it is fairly easy to embed a watermark in the frequency domain of a video frame or an image because the frequency domain is visually imperceptible. By contrast, it is much more difficult to hide a watermark in the frequency domain of audio because the frequency domain is what we actually hear. As such, it is challenging to embed an audio watermark in the frequency domain of an audio file in a way that is imperceptible to a listener, but still detectable. For similar reasons, attacks are generally easier to detect in the visual domain than in the audio domain. For example, reverb used to remove a watermark from an image often introduces visual artifacts that make it relatively easy to see that the image has been doctored. By contrast, an attack that introduces audio artifacts can be more challenging to detect because people may attribute the artifacts to background noise. It is for many of these reasons that conventional audio watermarking techniques fail.

More generally, conventional audio watermarking techniques suffer from a number of common limitations. One of the main design goals for audio watermarking is the ability of the watermark to withstand various types of audio degradation that can result from common audio signal processing operations and intentional "attacks" against the watermark that seek to remove the watermark. However, conventional audio watermarking techniques are not able to withstand many modern attacks. For example, conventional audio watermarking techniques are usually only designed to withstand certain types of degradation to an audio waveform, such as degradation resulting from common audio signal processing operations such added background noise or music, filtering, and compression (e.g., MP3 compression). As a result, the robustness of conventional audio watermarks is limited to artifacts introduced by common audio signal processing such as compression and filtering. Accordingly, conventional audio watermarks are vulnerable to many types of attacks.

One scenario in which an attacker may try to remove an audio watermark is for a deepfake that reuses some original audio, but edits it for some malicious purpose. There are typically two types of audio deepfakes: a partial synthesis attack which may change a word or two to change the meaning of speech, and a full synthesis attack which completely changes the identity of the speaker (e.g., an attacker records a message and changes the speaker to have someone else's voice). Normally, an attacker does not want much distortion or many artifacts in the edited audio, as people would then question whether the audio is fake. However, there are not many ways to attack an audio clip without introducing substantial degradation. Furthermore, modern attackers are familiar with the limitations of conventional audio watermarks and have found fairly simple methods for circumventing them without substantial degradation. For example, modern attackers can remove many conventional audio watermarks through the use of pitch shifting, added reverb, time-stretching, denoising, replaying through the air and re-recording, resynthesis, and the like. These types of modern attacks are completely different than standard audio editing techniques that motivate the design of most conventional audio watermarking. Thus, a modern attacker may manipulate conventionally watermarked audio using audio editing tools such that the watermark is no longer detectable. However, an audio watermark should survive even when attack and manipulation methods such as these are applied. As such, there is a need for improved techniques for detecting the presence of an audio watermark in a degraded audio waveform.

The closest work to solving this problem is a recent publication on audio watermarking that can survive reverberance. The motivation for this work is to prevent a digital assistant from waking up when a commercial uses a wake word. For example, audio from a commercial including the wake word could be embedded with an audio watermark that indicates the digital assistant should not wake up. In this scenario, the type of degradation their watermark needs to withstand is that resulting from re-recording and air transmission. Thus, this technique involves a type of spread spectrum watermarking that is robust to reverberation and desynchronization. Their detector uses a modulated self-correlation of successive chunks of audio to detect the presence of the audio watermark. However, this technique is not designed to be robust to other types of degradation or the modern attack techniques described above. As a result, this technique is also vulnerable to many types of modern attacks. This technique is described in more detail below with respect to FIGS. 3A and 3B.

Furthermore, the emergence of deepfakes necessitates an adequate preventative technological response. However, conventional audio watermarking techniques are ill-suited to detect deepfake audio forgeries. In this scenario, a person who generates an audio waveform may seek to prevent (or detect) its use to drive deepfakes. However, some deepfake audio can be synthesized using deep learning techniques that learn to detect patterns that are imperceptible to humans. Moreover, deep learning techniques may be able to use audio watermarked waveforms to synthesize deepfakes that minimize the degradation of the watermark. This makes it harder to detect audio forgeries, and conventional audio watermarks are simply not designed to detect this kind of degradation. For this additional reason, there is a need for improved techniques for detecting the presence of an audio watermark in a degraded audio waveform.

As modern watermarking techniques become more robust in order to withstand modern attacks, they should still remain imperceptible, yet detectable. This suggests the use of deep learning, which may be the best suited technique for detecting even the most imperceptible and damaged audio watermarks. As such, embodiments of the present invention are directed to secure audio watermarking and audio authenticity verification based on neural networks. An audio watermark detector can be implemented using a variety of neural network architectures such that the audio watermark detector can learn to detect the presence of a particular audio watermark embedded using a particular embedding technique. More specifically, an audio watermark detector may be trained on a specific combination of a particular audio watermark and a particular embedding technique. An audio watermark detector may be trained on any such combination. That is, it does not matter how the watermark is generated or how it gets embedded. As long as the audio watermark detector is trained on same combination used in operation, the audio watermark detector can learn to detect the presence of the watermark in an audio file under test. The audio watermark may be a single audio watermark that serves as a type of authenticity watermark, which the neural network can detect—without the need to input the original watermark—because the neural network was trained to recognize the watermark and embedding technique through training data. Thus, an audio watermark detector can learn to detect the presence of the authenticity watermark when the embedding and detection strategies match.

By way of illustration, consider an example workflow involving audio generation. A generated audio signal may be recorded (e.g., using a microphone), synthesized, edited, or otherwise manipulated using any algorithm. For example, voice manipulation software may be used to generate the audio signal. Recent developments in voice manipulation software have enabled a variety of benefits, such as the ability to correct audio podcasts, audio book recordings, or other voice tracks without having to rebook presenters or voiceover artists. However, voice manipulation software can raise a number ethical and security concerns, including risks of falsified evidence, manipulation of biometric characteristics in authentication systems, and fake news. As such, it may be desirable to imprint some detectible indication of authenticity or source on the generated audio signal. Accordingly, voice manipulation software (or some other audio generation or editing software) can be configured to embed an audio watermark into a generated audio signal (e.g., an audio clip) using a particular embedding technique. This way, audio signals generated using the software can be detected. By way of nonlimiting example, an audio watermark detector can be included in biometric authentication systems, or simply used to perform audio authenticity verification. Detection of the audio watermark from an audio clip under test can serve as an indication that the voice manipulation software was used to generate the audio clip, which can in turn indicate that some type of audio or voice manipulation was performed on the underlying audio. Thus, an audio watermark detector can be used to identify and flag manipulated audio evidence, biometric audio characteristics, journalistic audio reports, deepfake audio, and other attacked audio signals.

More specifically, audio generation or editing software may be used to generate an audio signal (e.g., an audio clip or waveform), and embed an audio watermark in the generated audio signal to generate a watermarked audio signal. Any suitable audio watermark and embedding technique may be used. For example, an audio watermark may be randomly generated, generated using a rule-based method, or otherwise. Generally, an audio watermark may take the form of any suitable data structure such as a vector of a designated length (e.g., 4 k), and may have values taking any suitable form (e.g., binary, integer, real, Boolean, etc.). Further, any suitable embedding technique may be used, such as amplitude modification, dither watermarking, phase coding, echo watermarking, spread spectrum watermarking, psychoacoustic embedding, and the like. The watermarked audio signal may be manipulated in various ways, whether through standard signal processing operations (e.g., compression and filtering) or attacks on the audio designed to remove the audio watermark (e.g., pitch shifting, added reverb, time-stretching, denoising, re-recording, resynthesis), resulting in degradation to the audio. For example, an attacker might try to use the watermarked audio signal to generate deepfake audio, manipulate audio evidence, manipulate biometric audio characteristics, or other types of attacks that will generally degrade the audio watermark.

An audio watermark detector corresponding to the particular audio watermark and embedding technique used at the front end of the workflow may be used to detect the presence of the degraded watermark from the degraded audio signal at the back end of the workflow. In this manner, the audio watermark detector can detect whether the audio generation or editing software was used to generate a particular audio signal under test. As such, the audio watermark detector can be used to detect and flag the presence of the audio watermark (and by implication, the use of the audio generation software). Depending on the corresponding source software (e.g., when the source software is voice manipulation software), detecting the audio watermark an in audio signal can be used to indicate tampering or forgery (e.g., a synthesized deepfake).

Generally, an audio watermark detector may be implemented using any suitable architecture. For example, an audio watermark detector may include a convolutional neural network that performs 1D convolutions on chunks of audio from a sliding window of a degraded audio signal and outputs a classification label indicating whether a particular chunk of audio is watermarked or not watermarked. Since an audio watermark may be embedded in and detected from each window (or some subset thereof), the window size for the detector may correspond to the length of the audio watermark. More generally, the size of the detector window (and/or the length of the desired audio watermark) may be selected based on the application of interest. The larger the window, the less audible the watermark may be. However, a shorter window (and/or a shorter watermark) may be better adapted for detecting microscopic edits, such as synthesized words or word-based edits. As such, the window size and/or length of the audio watermark may be selected based on the duration of potential edits to be detected (e.g., a duration on the order of word length, sentence length, etc.). Thus, the application of interest may drive the design choice for window size. By way of nonlimiting example, a 100 ms or 200 ms window may be selected. At a 22 k sampling rate, for example, 200 ms corresponds to 4 k samples, so an audio watermark with a length of up to 4 k (e.g., a code with up to 4000 values) may be embedded in each 200 ms chunk of audio and detected from a particular window of audio.

The detector may be fed a plurality of chunks (e.g., successive, non-overlapping chunks) of degraded audio and may output a classification for each chunk (e.g., watermarked or not watermarked). A probabilistic metric may be applied to generate an overall classification for an audio signal under test (e.g., detect the presence of the watermark based on some threshold amount of chunks such as 50% or 90% being classified as having the watermark). The overall classification and/or the underlying classification values per audio chunk may be output as a classification result to provide an indication of whether the audio watermark has been detected in the audio signal under test.

In some embodiments, the audio watermark detector may accept as inputs a designated number of time domain samples corresponding to a particular window of audio. Operating on time domain samples can result in a variety of benefits. Generally, the windowing process and the phase of the windows can impact the frequency representation of the audio signal, so using time domain samples can provide better stability than the frequency domain. Furthermore, certain types of modern attacks like pitch- or phase-shifting may be destructive of certain frequency domain representations. For example, a pitch- or phase-shift attack can shift the frequency domain representation (e.g., by a constant). When using certain frequency-embedded watermarks (e.g., a randomly generated watermark embedded in the frequency domain), shifting the frequency domain representation can damage the frequency-domain representation of an audio watermark, which can effectively circumvent conventional convolution-based detectors that look for the watermark by analyzing frequency samples. Using an audio watermark detector that evaluates time domain samples can fortify against these types of attacks because the time domain representation of the watermark is more robust to these attacks.

Similar destructive frequency-domain effects can occur from other scenarios that are conventionally ignored. For example, another type of modern attack involves playing back audio and re-recording the audio using a different device than the one that was originally used to record the audio. However, if the original recording device (e.g., a smart phone) and the device used for re-recording (e.g., a laptop computer) have different clock cycles or misaligned device clocks, the re-recorded audio signal can experience time-shifting (e.g., every 400 samples). This will shift the frequency domain representation by a noticeable amount such that certain type of frequency-embedded audio watermarks might be lost. Traditionally, this has not been a concern because conventional scenarios of interest such as trading MP3 files involve little to no distortion. However, modern audio watermark detectors should be robust to distortion caused by different clock cycles or misaligned device clocks. Using an audio watermark detector that evaluates time domain samples can make the detector robust to these types of modern attacks where conventional detection techniques typically fail.

Generally, an audio watermark detector may be trained using any suitable training dataset selected or generated based on the application of interest. For example, to detect doctored single-person speech, a training dataset can be formed using a collection of audio clips of a single person speaking at a time. Generally, the audio clips may be embedded with a particular watermark using a particular embedding technique. A dedicated audio watermark detector may be trained for each specific combination of audio watermark and embedding technique, so training a particular audio watermark detector may involve embedding audio clips with the same watermark using the same embedding technique. For example, to train an audio watermark detector, an audio clip may be randomly selected from the collection, and the selected clip may be embedded with a watermark based on a first metric (e.g., 50% of the time). Then, the resulting audio may be degraded using a selected degradation method based on a second metric (e.g., 50% of the time). The degradation method may be selected from a group of methods (e.g., standard signal processing operations such as noise and compression, attacks such as denoising and reverb, and the like) based on a third metric (e.g., randomly selected, round robin, etc.). The resulting audio clip may be passed through the audio watermark detector to output a classification label that may be compared with the corresponding ground truth label (e.g., whether a watermark was added or not), and a loss function may be used to update the detector (e.g., using backpropagation). Repeating this process over time, the audio watermark detector may be trained to detect the presence of the audio watermark and embedding technique from an audio signal under test.

In some embodiments, an audio watermark detector may be trained as part of an adversarial network in order to make the underlying audio watermark more robust to neural network-based attacks. More specifically, a neural network-based attacker may be jointly trained with the audio watermark detector. For example, a neural network attacker may be implemented using a generative neural network that attempts to remove an audio watermark without causing audible artifacts by synthesizing an audio clip that simulates a degraded watermark. The audio watermark detector may be implemented using a discriminator network that evaluates the degraded audio signals generated by the neural network attacker. Together, the attacker and detector can form a generative adversarial network (GAN) that may be jointly trained. Generally, training the attacker may seek to minimize: (1) the difference between the attacked audio (i.e., a degraded audio signal generated by the attacker) and the unattacked audio (e.g., a watermarked waveform that is input into the attacker); and (2) the detection accuracy of the detector. For example, at each time step (e.g., for each pass of a particular audio chunk through the GAN), the detector may be updated first, followed by the attacker. As the detector gets more accurate, the attacker will become more fierce because it tries to minimize the detection accuracy of the detector. On the other side of the GAN, as the attacker gets more fierce, the detector can become more robust because it tries to increase its accuracy while the attacks become more challenging. Thus, jointly training an audio watermark detector as part of an adversarial network with a neural network attacker can improve detection accuracy and make the detector more robust to neural network-based attacks.

As such, using implementations described herein, a neural-network based audio watermark detector may be used for secure audio watermarking and audio authenticity verification. Generally, the audio watermark detector may include a neural network trained to detect a particular audio watermark and embedding technique, which may indicate source software used in a workflow that generated the audio file under test. For example, the watermark may indicate an audio file was generated using voice manipulation software, so detecting the watermark can indicate manipulated audio such as deepfake audio and other attacked audio signals. In some embodiments, the audio watermark detector may be trained as part of a generative adversarial network in order to make the underlying audio watermark more robust to neural network-based attacks. Generally, the audio watermark detector may evaluate time domain samples from chunks of an audio clip under test to detect the presence of the audio watermark and generate a classification for the audio clip. Using various techniques described herein, the present detector can significantly improve detection accuracy over prior techniques, with the robustness to handle a variety of attacks that conventional techniques are unable to handle.

Having briefly described an overview of aspects of the present invention, various terms used throughout this description are provided. Although more details regarding various terms are provided throughout this description, general descriptions of some terms are included below to provider a clearer understanding of the ideas disclosed herein:

As used herein, a neural network generally refers to a machine-learning model that learns to approximate unknown functions by analyzing example (e.g., training) data at different levels of abstraction. Generally, neural networks can model complex non-linear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data.

As used herein, an audio watermark is some signal, code, or identifier embedded into an audio waveform to indicate some meta information about the audio, such as copyright ownership. Generally, audio watermark may take the form of any suitable data structure such as a vector of a designated length and may have values taking any suitable form (e.g., binary, integer, real, character, Boolean, etc.). Audio watermarking is the process of embedding and/or detecting an audio watermark. Audio watermarks are commonly designed to be imperceptible (e.g., should not impact audio quality), robust (e.g., able to withstand common signal processing and attacks), detectible, and secure (detectible only by authorized parties). There are a number of types of embedding techniques for audio watermarking, such as amplitude modification, dither watermarking, phase coding, echo watermarking, spread spectrum watermarking, and psychoacoustic embedding.

Example Audio Watermarking Environment

Referring now to FIG. 1, a block diagram of example environment 100 suitable for use in implementing embodiments of the invention is shown. Generally, environment 100 is suitable for audio watermarking, and, among other things, facilitates secure audio watermarking and audio authenticity verification based on neural networks. Environment 100 includes a client device 105, an attack device 120, and a server 135. Any or all of these devices may be any kind of computing device capable of facilitating audio watermarking. For example, in an embodiment, client device 105, attack device 120, and/or server 135 are computing devices such as computing device 700, as described below with reference to FIG. 7. In embodiments, client device 105, attack device 120, and/or server 135 can be a personal computer (PC), a laptop computer, a workstation, a mobile computing device, a PDA, a cell phone, or the like. The components of environment 100 may communicate with each other via a network 130, which may include, without limitation, one or more local area networks (LANs) and/or wide area networks (WANs). Such networking environments are commonplace in offices, enterprise-wide computer networks, intranets, and the Internet.

To begin with a high level overview of an example workflow through the configuration illustrated in FIG. 1, a client may use audio application 107 (e.g., via audio generator user interface 110) to generate some type of audio waveform. Generally, audio application 107 may be any application capable of facilitating audio generation or editing, such as Adobe® Audition® provided by Adobe, Inc. In another example, audio application 107 may be any application capable of facilitating voice manipulation or editing, such as Adobe VoCo. Audio application 107 may be hosted at least partially server-side, such that it coordinates with secure audio watermarking component 140 of server 135 to generate the audio waveform and/or embed an audio watermark in the generated waveform. Any allocation of functionality may be implemented across the various devices. For example, recording and/or editing may occur on client device 105, and client device 105 may send a recorded and/or edited waveform to server 135, which may embed an audio watermark and return a watermarked audio waveform. In another example, client device 105 may receive input commands and transmit them to server 135, which may perform audio editing and/or synthesis to generate an audio waveform, embed an audio watermark, and return a watermarked audio waveform. These are just examples, and any suitable allocation of functionality among these or other devices may be implemented.

With the watermarked audio waveform, a client may use audio application 107 or some other application to perform one or more signal processing operations. Some common examples of audio signal processing operations include added background noise or music, filtering, and compression (e.g., MP3 compression), although other operations may additionally or alternatively occur. The watermarked audio waveform (which may be degraded by the signal processing operations) may but need not be included in an audio track for a video file. The watermarked audio waveform may be distributed or otherwise made available to others, for example, by posting or streaming to social media, websites, or other ways of sharing.

However, the watermarked audio waveform may fall into the hands of a would-be attacker. The attacker may use an attack device 120 to access (e.g., download, record, etc.) the watermarked audio waveform and perform some type of attack. Generally, the attacker might try to use the watermarked audio waveform to generate deepfake audio, manipulate audio evidence, manipulate biometric audio characteristics, or other types of attacks that will generally degrade the audio watermark. In the example illustrated in FIG. 1, the attacker may use deepfake generator 125 to generate deepfake audio using use the watermarked audio waveform as an input. The process of generating the deepfake audio may degrade the audio watermark, resulting in a degraded audio waveform. This is meant simply an example, and generally any type of attack on the watermarked audio waveform may occur, such as pitch shifting, added reverb, time-stretching, denoising, re-recording, resynthesis, and others. The attacked (degraded) audio waveform may but need not be included in an audio track for a video file (e.g., deepfake audio used for a deepfake video). The degraded audio waveform (e.g., the deepfake) may be distributed or otherwise made available to others, for example, by posting or streaming to social media, websites, or other ways of sharing.

Questions may arise whether a particular audio waveform (e.g., an audio clip, an audio track from a video file, etc.) is authentic. For example, deepfake audio may be held out as being authentic, when in fact it was generated based on synthesized audio that was originally generated using audio application 107. As such, in some embodiments, an audio waveform may be tested for the presence of the audio watermark embedded by server 135. For example, the audio watermark may serve as an authenticity watermark indicating the software source was audio application 107, such that detection of the watermark in an audio waveform under test (e.g., a degraded audio waveform such as deepfake audio) indicates the audio waveform was generated with a workflow that included audio application 107. Thus, a positive detection may serve as an incitation that the audio waveform under test has been manipulated in some way (for example, in embodiments where audio application 107 is voice manipulation software).

Continuing with the example scenario of deepfake audio, a client may access the deepfake audio (hereinafter, the degraded audio waveform) and use audio authenticity verification software to check for the presence of the audio watermark in the degraded audio waveform. In the example illustrated in FIG. 1, audio application 107 may provide an audio authenticity verification portal 115 that provides an interface for the client to access and forward the degraded audio waveform to server 135 for watermark detection. Audio application 107 may be hosted at least partially server-side, such that it coordinates with secure audio watermarking component 140 of server 135 to perform audio watermark detection. Any allocation of functionality may be implemented across the various devices. For example, client device 105 may receive input commands and transmit them along with the degraded audio waveform to server 135, which may perform audio watermark detection and return classification results. This configuration is described merely as an example, as the audio authenticity verification functionality may be implemented using some other software (e.g., a dedicated application, incorporated into some other software such as biometric authentication software, a mobile application, a web application, incorporated into an operating system, hosted at least partially server-side, etc.), and may reside or otherwise be accessible using some other device besides client device 105 of FIG. 1. In other words, authenticity verification need not be triggered by the same device used to generate the original audio waveform. These and other variations are completed within the present disclosure.

In the embodiment illustrated in FIG. 1, server 135 includes secure audio watermarking component 140. At a high level, secure audio watermarking component 140 performs various functions that support secure audio watermarking and audio authenticity verification based on neural networks. In this example configuration, secure audio watermarking component 140 includes secure audio generator 145, audio authenticity verification component 165, and audio attack simulator 175. Generally, secure audio generator 145 may generate an audio waveform, generate or access an audio watermark, and embed the watermark in the generated audio waveform to create a watermarked audio waveform. Audio authenticity verification component 165 may detect the presence or absence of the watermark from an audio waveform under test, such as a degraded audio waveform with a degraded watermark resulting from signal processing operations and attacks designed to remove the watermark. Audio attack simulator 175, which will be discussed in more detail below, may be used to assist training audio watermark detector 170 of audio authenticity verification component 165.

Generally, secure audio generator 145, audio authenticity verification component 165, and/or audio attack simulator 175 may be incorporated, or integrated, into one or more applications or add-ons or plug-ins to an application. The application(s) may be a stand-alone application, a mobile application, a web application, or the like. In some implementations, the application(s) comprise a web application, which can run in a web browser, and could be hosted at least partially client-side. In addition, or instead, the application(s) can comprise a dedicated application. In some cases, the application(s) can be integrated into the operating system (e.g., as a service). Additionally or alternatively, secure audio generator 145, audio authenticity verification component 165, and/or audio attack simulator 175, or some portion thereof, may be integrated into the operating system (e.g., as a service), and/or distributed across one or more other devices (e.g., a remote client or server). The configuration illustrated in FIG. 1 is meant simply as an example, and any suitable allocation of functionality among any configuration of devices may be implemented.

In the example illustrated in FIG. 1, secure audio generator 145 includes audio waveform generator 150, audio watermark generator 155, and audio watermark embedder 160. Generally, audio waveform generator 150 may generate an audio waveform using any algorithm. For example, audio waveform generator 150 may receive an initial audio waveform (e.g., a recorded audio waveform) and input commands indicating various edits or target audio parameters (e.g., entered via audio generator user interface 110 and received via network 130), and audio waveform generator 150 may generate an audio waveform implementing the edits. In another example, audio waveform generator 150 may support voice manipulation or editing, and may synthesize or edit vocals in an audio waveform to generate the audio waveform. These are meant examples, and any type of algorithm may be used to generate the audio waveform.

Audio watermark generator 155 may generate or otherwise access an audio watermark, and audio watermark embedder 160 may embed the audio watermark into the generated audio waveform to create a watermarked audio waveform. Any suitable audio watermark and embedding technique may be used. For example, an audio watermark may be randomly generated, generated using a rule-based method, or otherwise. Generally, an audio watermark may take the form of any suitable data structure such as a vector of a designated length (e.g., 4 k), and may have values taking any suitable form (e.g., binary, integer, real, character, Boolean, etc.). Further, any suitable embedding technique may be used, such as amplitude modification, dither watermarking, phase coding, echo watermarking, spread spectrum watermarking, psychoacoustic embedding, and the like. The resulting watermarked audio waveform may be provided (e.g., by secure audio watermarking component 140 and/or audio watermark embedder 160) to client device 105.

As described above, it may be desirable to test a particular audio waveform for the presence or absence of the audio waveform. Thus, audio authenticity verification component 165 may be provided with an audio waveform to test, and audio watermark detector 170 of audio authenticity verification component 165 may detect the presence or absence of the watermark from the audio waveform, assuming the audio waveform under test was originally embedded with the audio watermark (e.g., by audio watermark embedder 160) using a corresponding embedding technique. However, the watermark may have been degraded in various ways, as explained in more detail below.

Figure 2:
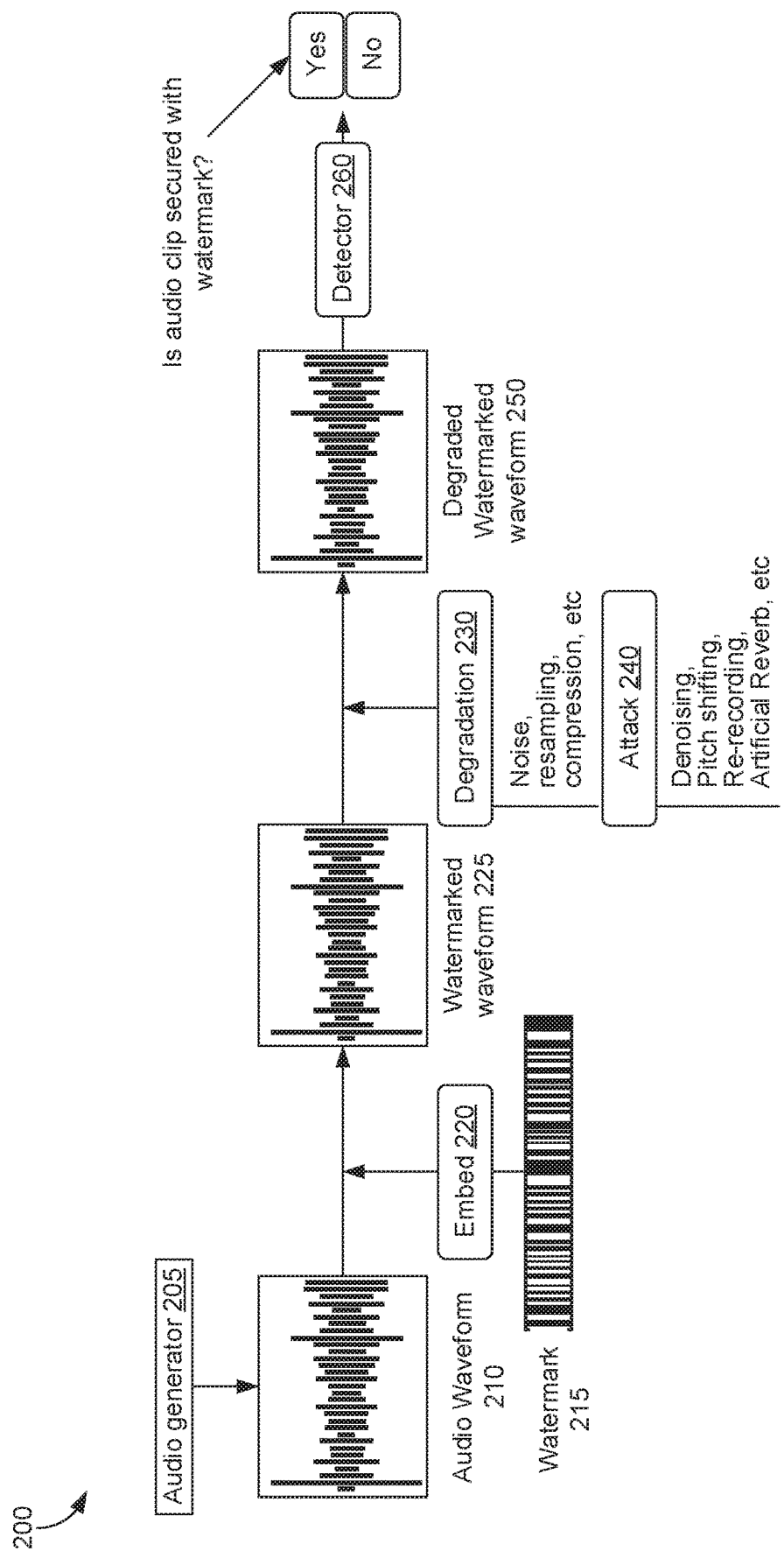
FIG. 2 is a block diagram of an example audio watermarking workflow, in accordance with embodiments of the present invention.

FIG. 2 illustrates an example audio watermarking workflow 200 in which degradation may occur. Initially at block 205, audio generation occurs (e.g., by audio waveform generator 150 of FIG. 1) to generate audio waveform 210. At block 220, audio watermark 215 (which may be generated or accessed by audio watermark generator 155 of FIG. 1) is embedded in audio waveform 210 (e.g., by audio watermark embedder 160 of FIG. 1) to create watermarked waveform 225. Generally, watermarked waveform 225 may be manipulated in various ways that can cause degradation (e.g., to the embedded watermark). For example, degradation 230 may occur as a result of audio signal processing operations such as added background noise or music, filtering, resampling, compression, or other operations. Degradation 230 may additionally or alternatively occur as a result of attack 240 on watermarked waveform 225. For example, an attacker (e.g., using attack device 120 of FIG. 1) may perform one or more attacks 240 such as pitch shifting, added reverb, time-stretching, denoising, re-recording, resynthesis, and others. The result of these signal processing operations and/or attacks is a degraded watermarked waveform 250.

Generally, detector 260 (which may correspond with audio watermark detector 170 of FIG. 1) evaluates degraded watermarked waveform 250 to detect the presence or absence of audio watermark 215. Detector 260 may be implemented using any suitable architecture. For example, detector 260 may include a convolutional neural network that performs one or more 1D convolutions on chunks of audio from a sliding window of degraded watermarked waveform 250 and outputs a classification label indicating whether a particular chunk of audio is watermarked or not watermarked. Generally, a neural network may be defined that takes in audio samples from a chunk of audio from degraded watermarked waveform 250 (e.g., a designated number of time domain samples corresponding to a window of degraded watermarked waveform 250) and outputs a binary classification result (e.g., watermarked or not watermarked). A nonlimiting example architecture for detector 260 can be found in Table 1 below. The rows of Table describe characteristics of the different layers of the example architecture for detector 260, starting from the top down. For example, the first layer of this architecture performs a 1D convolution with a kernel size of 64 and a stride of 2, followed by a max pooling layer, and so on. Generally, the application of interest may drive the design choice for window size, number of samples to input into the detector, and parameters for the different layers. This architecture is meant simply as an example, and any number of layers performing these or other functions in any suitable order may be implemented.

TABLE 1

RELU

| Conv1d | Kernel: 64 \| in: 1 \| out: 8 \| stride: 2 |
|---|---|
| Max pooling | Size: 8 \| strides: 8 \| padding: SAME |
| Conv1d | Kernel: 32 \| in: 16 \| out: 32 \| stride: 2 |
| Max pooling | Size: 8 \| strides: 8 \| padding: SAME |
| Conv1d | Kernel: 16 \| in: 32 \| out: 64 \| stride: 2 |
| Reshape layer | 512 |
| Dense layer | In: 512 \| out: 128 |
| Dense layer | In: 128 \| out: 2 |

In operation, detector 260 may be fed chunks of degraded watermarked waveform 250 (e.g., successive or periodic chunks, overlapping or non-overlapping chunks, etc.), and detector 260 may output a classification for each chunk (e.g., watermarked or not watermarked). A probabilistic metric may be applied based on the classifications of the chunks to generate an overall classification for degraded watermarked waveform 250 (e.g., detect the presence of the watermark based on some threshold amount of chunks such as 50% or 90% being classified as having the watermark). The overall classification and/or the underlying classifications of the evaluated audio chunks may be output (e.g., via audio authenticity verification portal 115 of FIG. 1) to provide an indication of whether audio watermark 215 has been detected in degraded watermarked waveform 250. For example, if a user uploads degraded watermarked waveform 250 (e.g., via audio authenticity verification portal 115 of FIG. 1), a binary classification may be returned (e.g., watermarked or not watermarked, generated with particular source software or not, forgery or not, etc.). Additionally or alternatively, classifications of the evaluated audio chunks may be output in any suitable form such as a list, table, time-dependent graph, or otherwise.

Generally, detector 260 may be trained using any suitable training dataset selected or generated based on the application of interest. For example, to detect doctored single-person speech (which covers a majority of deepfake audio scenarios), a training dataset can be formed using a collection of speech recordings of a single person speaking at a time. An example collection is the DAPS (Device and Produced Speech) Dataset, which is a collection of speech recordings in various reading environments. Another example is the Centre for Speech Technology Voice Cloning Toolkit (VCTK), which is a collection of speech recordings with various accents. Generally, the speech recordings may be embedded with a particular watermark using a particular embedding technique. Detector 260 may be trained as a dedicated audio watermark detector for a particular combination of an audio watermark and an embedding technique, so training detector 260 may involve embedding speech recordings with the same watermark using the same embedding technique. For example, to train detector 260, a speech recording may be randomly selected from the collection, and the selected recording may be embedded with the audio watermark based on a first metric (e.g., 50% of the time). Then, the resulting audio may be degraded using a selected degradation method based on a second metric (e.g., 50% of the time). The degradation method may be selected from a group of methods (e.g., standard signal processing operations such as noise and compression, attacks such as denoising and reverb, and the like) based on a third metric (e.g., randomly selected, round robin, etc.). The resulting audio recording (which may be watermarked and/or degraded) can be passed through detector 260 to output a classification label that may be compared with the corresponding ground truth label (e.g., whether the watermark was added or not), and a loss function may be used to update detector 260 (e.g., using backpropagation). Repeating this process over time, detector 260 may be trained to detect the presence of the audio watermark and embedding technique from an audio signal under test (e.g., degraded watermarked audio waveform 250).

Figure 3A:
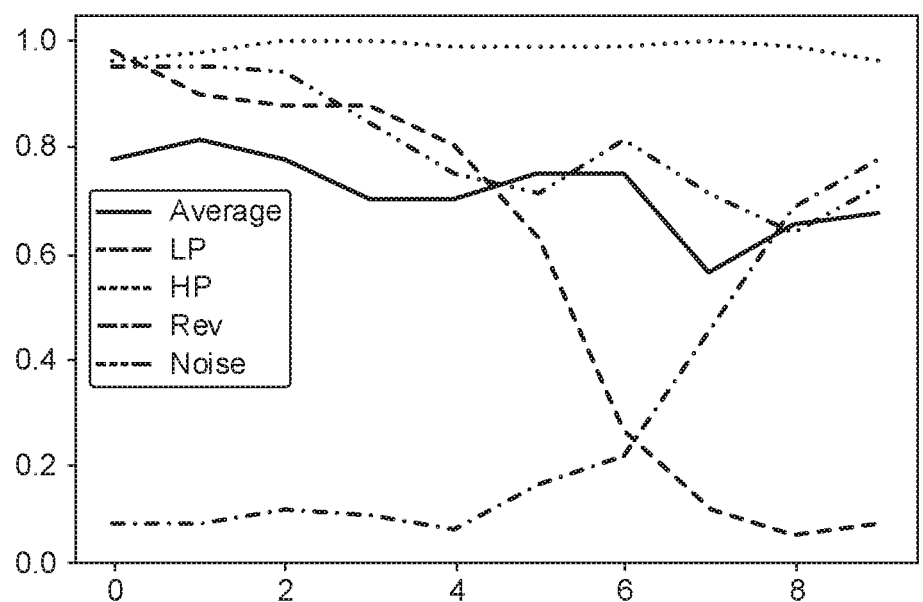
FIGS. 3A and 3B depict graphs that illustrate the performance of an example implementation of certain embodiments of the present technique (FIG. 3B) compared to a prior technique (FIG. 3A)
Figure 3B:
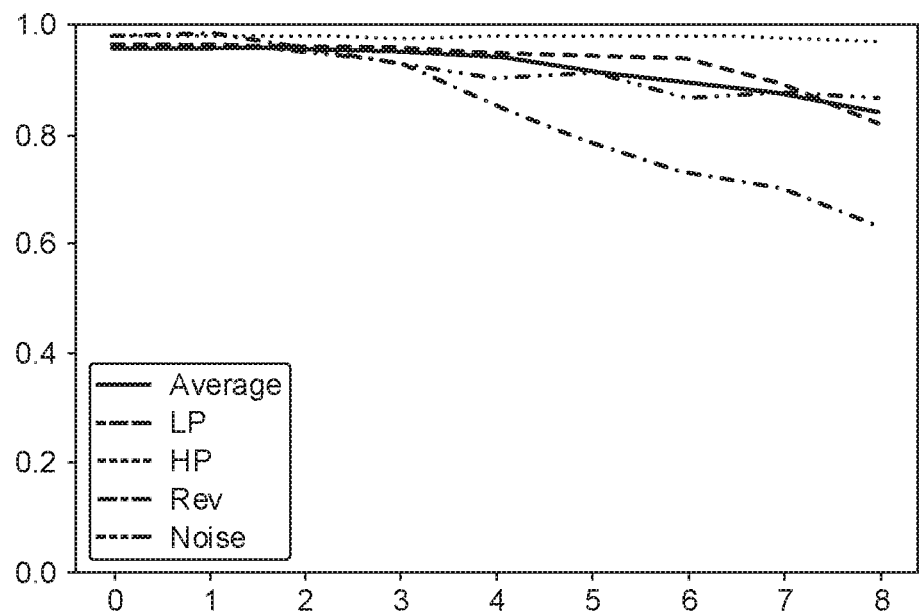

FIGS. 3A and 3B depict graphs that illustrate the performance of an example implementation of certain embodiments of the present technique (FIG. 3B) compared to a prior technique (FIG. 3A). The prior technique is described in the recent publication on audio watermarking that can survive reverberance, described above. More specifically, the prior technique uses Eigen-watermarking, where the watermark is selected as an eigenvector of a full rank symmetric matrix and embedded in selected midrange DCT coefficients of audio blocks. As a demonstration, the example architecture of Table 1 was configured to take in an Eigen-watermarked chunk of audio and output a classification label (watermarked or no), and was trained using four types of degradation and attack types (low-pass filter, high-pass filter, room reverberation, and additive Gaussian noise) varied to simulate different levels of attack strength. FIG. 3A illustrates the performance of the prior technique's baseline detector, and FIG. 3B illustrates a detector implemented using the present techniques. In each graph, the x-axis is the attack strength, with weakest to strongest attack strength plotted from left to right. The y-axis is detection accuracy averaged across each audio block. As can be seen, the present techniques produce more accurate and more consistent results across the range of different attack strengths.

Furthermore, the prior technique includes a tunable parameter η that varies the strength of the watermark. In the demonstration, the baseline model was tested with a much more perceptible watermark ($\eta$=80, which produces a discernable sound similar to wind), while the detector implemented using the present techniques was tested with a much more imperceptible watermark ($\eta$=8, which is barely noticeable). As the graphs illustrate, the present techniques displayed better accuracy in detecting more imperceptible watermarks than the prior technique.

Returning now to FIG. 1, in some embodiments, audio watermark detector 170 may be trained as part of an adversarial network in order to make the underlying audio watermark more robust to neural network-based attacks. More specifically, a neural network-based attacker (e.g., audio attack simulator 175) may be jointly trained with audio watermark detector 170. For example, audio attack simulator 175 may be implemented using a generative neural network that attempts to remove an audio watermark without causing audible artifacts by synthesizing an audio waveform that simulates a degraded watermark. One example architecture that may be used for a neural network-based attacker is the 3-way split variant of the FFTNet neural vocoder structure described in Berthy Feng, Zeyu Jin, Jiaqi Su, and Adam Finkelstein, "Learning Bandwidth Expansion Using Perceptually-Motivated Loss," ICASSP, May 2019. Another example architecture is WaveNet, provided by Google. These are meant simply as examples, and other generative architectures may be implemented within the scope of the present disclosure.

In some embodiments, audio watermark detector 170 may be implemented using a discriminator network that evaluates the degraded audio signals generated by the neural network attacker. Together, the attacker (e.g., audio attack simulator 175) and detector (audio watermark detector 170) can form a generative adversarial network (GAN) that may be jointly trained. Generally, training the attacker may seek to minimize: (1) the difference between the attacked audio (i.e., a degraded audio signal generated by the attacker) and the unattacked audio (e.g., a watermarked waveform that is input into the attacker); and (2) the detection accuracy of the detector. For example, at each time step (e.g., for each pass of a particular audio chunk through the GAN), the detector may be updated first, followed by the attacker. As the detector gets more accurate, the attacker will become more fierce because it tries to minimize the detection accuracy of the detector. On the other side of the GAN, as the attacker gets more fierce, the detector can become more robust because it tries to increase its accuracy while the attacks become more challenging. Thus, jointly training audio watermark detector 170 as part of an adversarial network with a neural network attacker can improve detection accuracy and make the detector more robust to neural network-based attacks.

Example Flow Diagrams

Figure 4:
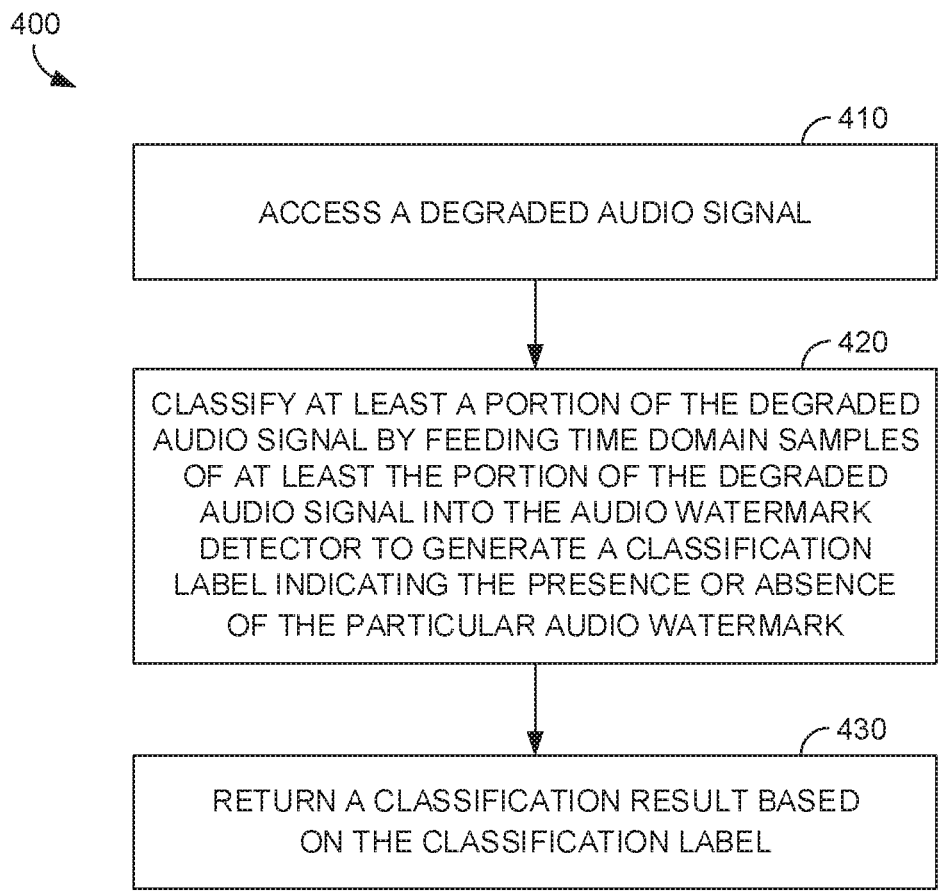
FIG. 4 is a flow diagram showing a method for audio watermark detection, in accordance with embodiments of the present invention.
Figure 5:
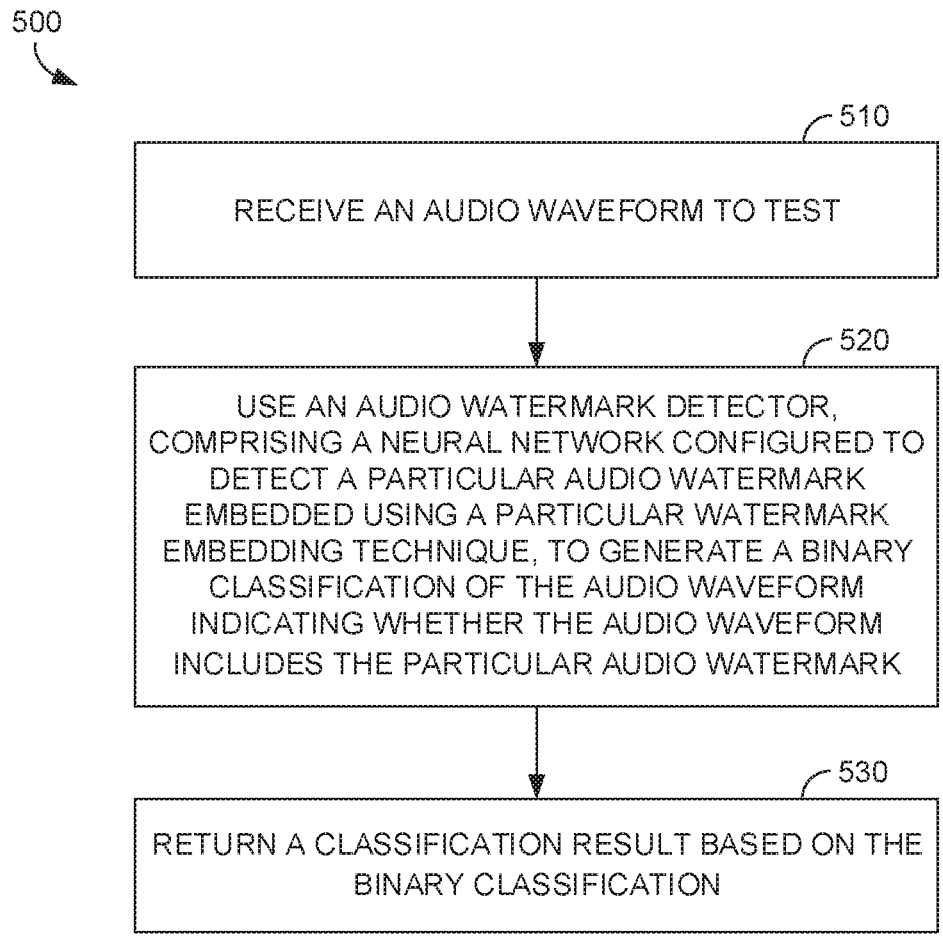
FIG. 5 is a flow diagram showing another method for audio watermark detection, in accordance with embodiments of the present invention.
Figure 6:
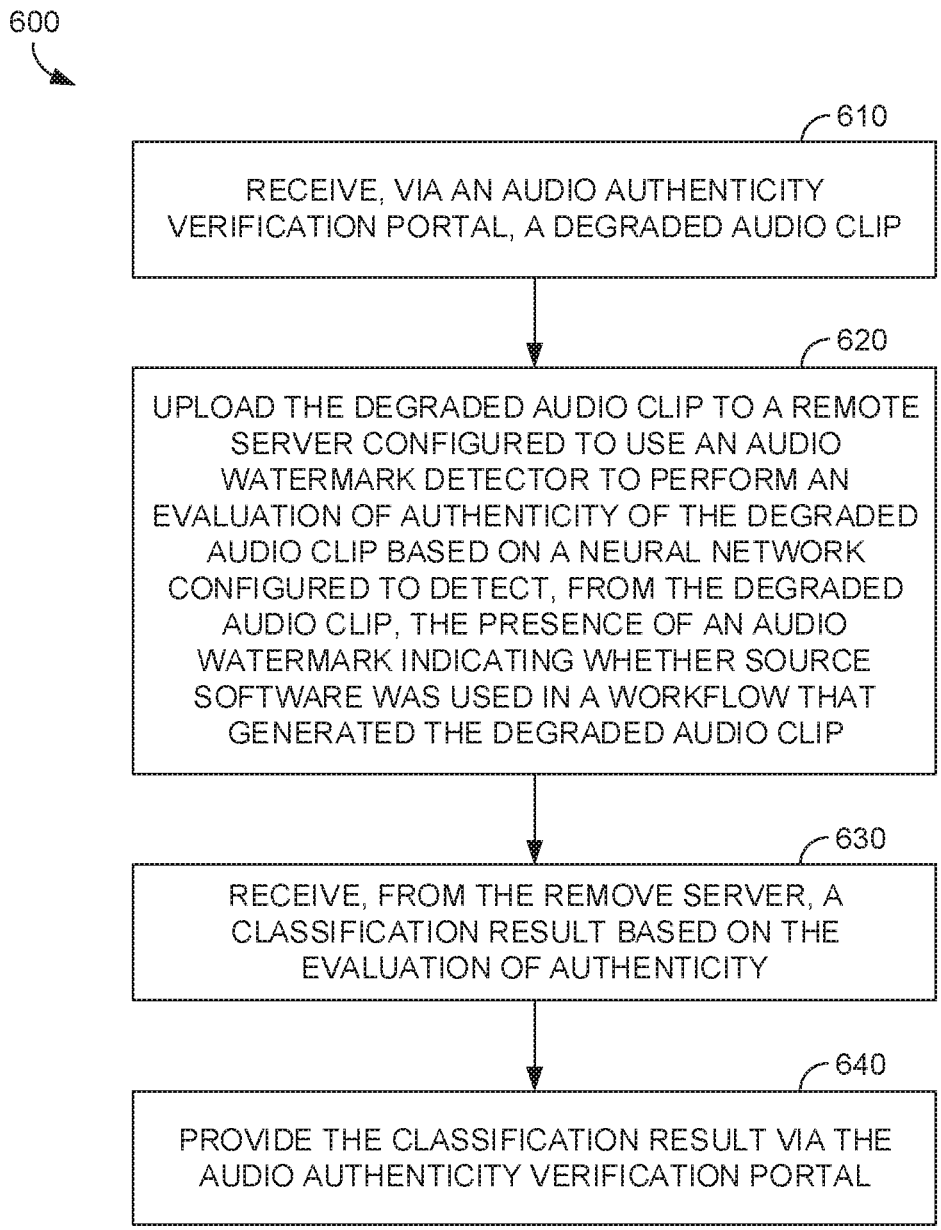
FIG. 6 is a flow diagram showing another method for audio watermark detection, in accordance with embodiments of the present invention.

With reference now to FIGS. 4-6, flow diagrams are provided illustrating methods for audio watermarking. Each block of the methods 400, 500, and 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 4, FIG. 4 illustrates a method 400 for audio watermark detection, in accordance with embodiments described herein. Initially at block 410 a degraded audio signal is accessed. For example, the degraded audio signal may be uploaded to a remote server to determine whether the degraded audio signal includes a particular audio watermark. At block 420, at least a portion of the degraded audio signal is classified by feeding time domain samples of at least the portion of the degraded audio signal into the audio watermark detector to generate a classification label indicating the presence or absence of the particular audio watermark. For example, the audio watermark detector may iteratively classify successive chunks of the degraded audio signal, generating a classification label for each of the chunks. At block 430, a classification result is returned based on the classification label. For example, the classification result may be an overall classification of the degraded audio signal based on a threshold amount of chunks being classified as having the audio watermark.

Turning now to FIG. 5, FIG. 5 illustrates a method 500 for audio watermark detection, in accordance with embodiments described herein. Initially at block 510, an audio waveform to test is received. At block 520, an audio watermark detector is used to generate a binary classification of the audio waveform. The audio watermark detector comprises a neural network configured to detect the particular audio watermark embedded using a particular watermark embedding technique. Thus, the binary classification of the audio waveform generated by the audio watermark detector indicates whether the audio waveform includes a particular audio watermark. At block 530, a classification result is returned based on the binary classification.

Turning now to FIG. 6, FIG. 6 illustrates a method 600 for audio watermark detection, in accordance with embodiments described herein. Initially at block 610, a degraded audio clip is received via an audio authenticity verification portal. For example, a client operating a client device may access the degraded audio clip and identify it through the portal. At block 620, the degraded audio clip is uploaded to a remote server configured to use an audio watermark detector to perform an evaluation of authenticity of the degraded audio clip based on a neural network. The neural network is configured to detect, from the degraded audio clip, the presence of an audio watermark indicating whether source software was used in a workflow that generated the degraded audio clip. At block 630, a classification result is received from the remote server. The classification result is based on the evaluation of authenticity. For example, the classification result may comprise an overall classification of the degraded audio clip generated based on a threshold amount of chunks of the degraded audio signal being classified by the audio watermark detector as having the audio watermark. Additionally or alternatively, the classification result may be a time-dependent graph indicating classifications over time of chunks of the degraded audio clip indicating whether the chunks of the degraded audio clip include the particular audio watermark. At block 640, the classification result is provided via the audio authenticity verification portal.

Example Operating Environment

Figure 7:
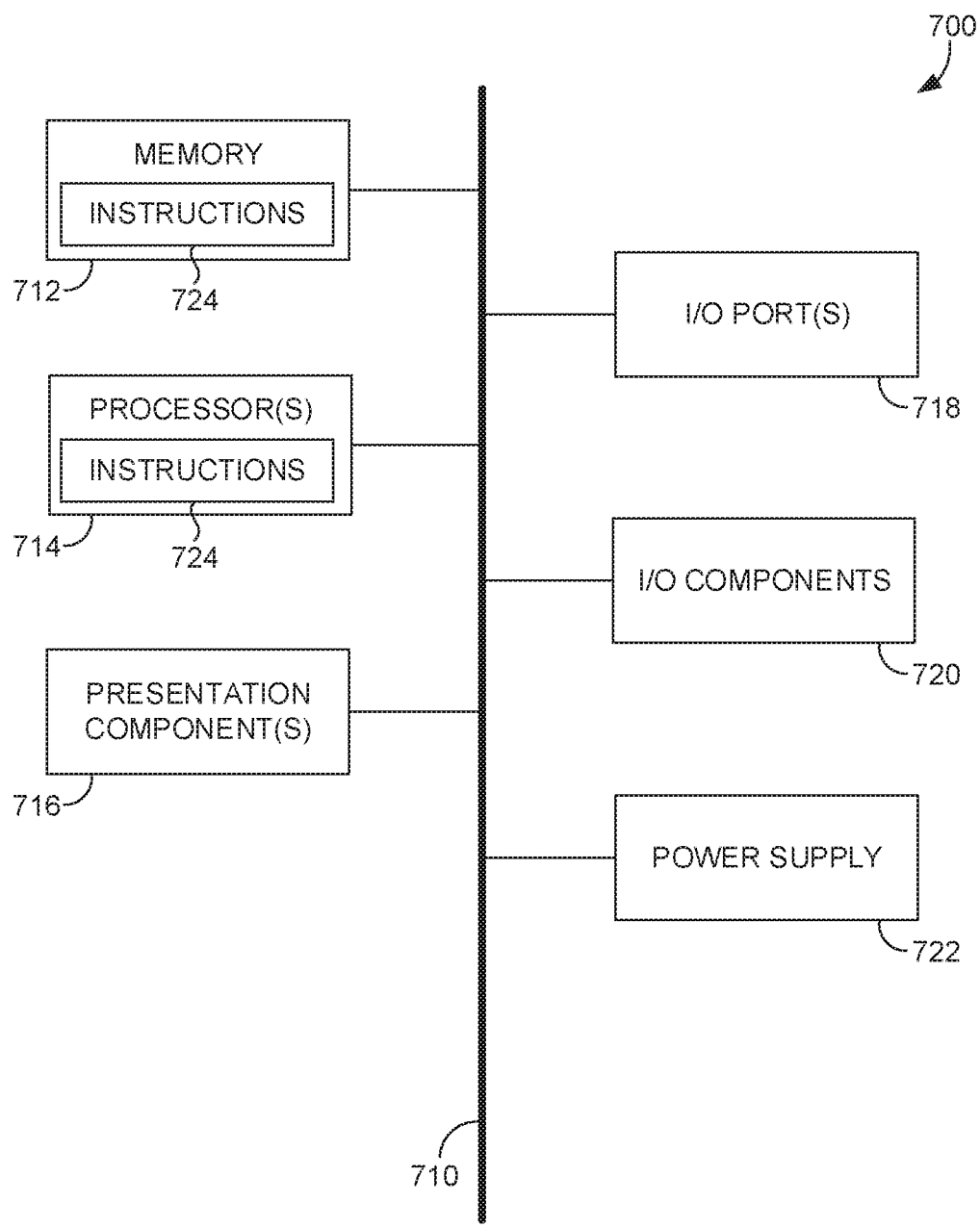
FIG. 7 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein support secure audio watermarking and audio authenticity verification based on neural networks. The components described herein refer to integrated components of an audio watermarking system. The integrated components refer to the hardware architecture and software framework that support functionality using the audio watermarking system. The hardware architecture refers to physical components and interrelationships thereof and the software framework refers to software providing functionality that can be implemented with hardware embodied on a device.

The end-to-end software-based audio watermarking system can operate within the audio watermarking system components to operate computer hardware to provide audio watermarking system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the audio watermarking system components can manage resources and provide services for the audio watermarking system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
   one or more hardware processors and memory comprising computer program instructions executable by the one or more hardware processors;
   an audio watermark detector comprising a neural network trained to perform a one dimensional (1D) convolution to detect, from an audio signal under test, presence or absence of a particular audio watermark embedded using a particular watermark embedding technique; and
   an audio authenticity verification component configured to use the one or more hardware processors to:
   access a degraded audio signal;
   classify at least a portion of the degraded audio signal by feeding time domain samples of at least the portion of the degraded audio signal into the neural network to generate a classification label indicating the presence or absence of the particular audio watermark; and
   return a classification result based on the classification label.

2. The computer system of claim 1, wherein the presence of the particular audio watermark indicates that source software was used in a workflow that generated the audio signal under test.

3. The computer system of claim 2, wherein the source software is voice manipulation software.

4. The computer system of claim 1, the audio watermark detector jointly trained with a neural network-based attacker as part of a generative adversarial network.

5. The computer system of claim 1, wherein the audio authenticity verification component is configured to use the audio watermark detector to iteratively classify successive chunks of the degraded audio signal by identifying the time domain samples from a sliding window of the degraded audio signal.

6. The computer system of claim 1, wherein the classification result comprises an overall classification of the degraded audio signal based on a threshold amount of chunks of the degraded audio signal being classified by the audio watermark detector as having the audio watermark.

7. A computerized method comprising:
   receiving an audio waveform;
   using an audio watermark detector, comprising a neural network configured to detect a particular audio watermark embedded using a particular watermark embedding technique, to perform a one dimensional (1D) convolution of time domain samples of the audio waveform to generate a binary classification of the audio waveform indicating whether the audio waveform includes the particular audio watermark; and
   returning a classification result based on the binary classification.

8. The computerized method of claim 7, wherein presence of the particular audio watermark indicates that source software was used in a workflow that generated the audio waveform.

9. The computerized method of claim 8, wherein the source software is voice manipulation software.

10. The computerized method of claim 7, further comprising jointly training the audio watermark detector with a neural network-based attacker as part of a generative adversarial network.

11. The computerized method of claim 7, wherein using the audio watermark detector to generate the binary classification comprises: using the audio watermark detector to iteratively classify a plurality of chunks of the audio waveform and generating the binary classification based on classifications of the plurality of chunks.

12. The computerized method of claim 7, wherein the classification result comprises a time-dependent graph indicating classifications over time of chunks of the audio waveform indicating whether the chunks of the audio waveform include the particular audio watermark.

13. The computerized method of claim 7, wherein using the audio watermark detector to generate the binary classification comprises feeding the time domain samples of the audio waveform into the neural network without inputting the audio watermark into the neural network.

14. One or more computer storage media storing computer-useable instructions that, when used by a computing device, cause the computing device to perform operations comprising:

receiving, via an audio authenticity verification portal, a degraded audio clip;

uploading the degraded audio clip to a remote server configured to use an audio watermark detector to perform an evaluation of authenticity of the degraded audio clip based on a neural network configured to perform a one dimensional (1D) convolution of time domain samples of the degraded audio clip to detect presence of an audio watermark indicating whether source software was used in a workflow that generated the degraded audio clip;

receiving, from the remove server, a classification result based on the evaluation of authenticity; and providing the classification result via the audio authenticity verification portal.

15. The one or more computer storage media of claim 14, wherein the degraded audio clip comprises deepfake audio.

16. The one or more computer storage media of claim 14, wherein the degraded audio clip is included in an audio track of a video file.

17. The one or more computer storage media of claim 14, the audio watermark detector jointly trained with a neural network-based attacker as part of a generative adversarial network.

18. The one or more computer storage media of claim 14, wherein the remote server is further configured to: perform the evaluation of authenticity using the audio watermark detector to iteratively classify a plurality of chunks of the degraded audio clip, and generate the classification result based on classifications of the plurality of chunks.

19. The one or more computer storage media of claim 14, wherein the classification result comprises a time-dependent graph indicating classifications over time of chunks of the degraded audio clip indicating whether the chunks of the degraded audio clip include the particular audio watermark.

20. The one or more computer storage media of claim 14, wherein the remote server is further configured to perform the evaluation of authenticity by feeding the time domain samples of the degraded audio clip into the audio watermark detector.

* * * * *